(12) United States Patent
Chang et al.

(10) Patent No.: US 6,279,930 B1
(45) Date of Patent: Aug. 28, 2001

(54) STRUCTURE OF SCOOTER

(76) Inventors: Yun-Chuan Chang; Chuan-Fu Kao, both of P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/472,211

(22) Filed: Dec. 27, 1999

(51) Int. Cl.$^7$ .............................. B62M 1/00; A63C 17/00
(52) U.S. Cl. .............................. 280/87.042; 280/87.041; 280/87.043; 280/87.01; 280/11.27
(58) Field of Search .................. 280/87.041, 87.042, 280/87.021, 263, 265, 266, 267, 11.19, 13, 14.3, 11.27, 11.28, 87.043, 87.01

(56) References Cited

U.S. PATENT DOCUMENTS

| | | | |
|---|---|---|---|
| 1,499,448 | * | 7/1924 | Crawford ........................ 280/11.15 |
| 3,746,118 | * | 7/1973 | Altorfer ................................ 180/210 |
| 4,054,297 | * | 10/1977 | Solimine ........................... 280/87.04 |
| 4,659,095 | * | 4/1987 | Halvorsen ........................ 280/11.27 |
| 5,169,166 | * | 12/1992 | Brooks ............................ 280/87.042 |
| 5,330,214 | * | 7/1994 | Brooks ............................ 280/87.042 |
| 5,536,029 | * | 7/1996 | Gramckow ......................... 280/263 |

FOREIGN PATENT DOCUMENTS

5225320 * 2/1977 (JP) .

* cited by examiner

*Primary Examiner*—J. J. Swann
*Assistant Examiner*—David Divine

(74) *Attorney, Agent, or Firm*—Dougherty & Troxell

(57) ABSTRACT

An improved structure scooter capable of responsive and stable, time- and energy-saving, as well as safe and convenient operation and utilization that is comprised of a footboard, a front wheel assembly, and a rear wheel assembly. The front wheel assembly is disposed at the anterior aspect of the footboard and is equipped at the center with an extension plate of a front mounting block—the extension plate providing for assembly to the footboard, a topside stem having a handhold at its upper extent and an active sleeve, and a front mounting block having a support fixture installed on its two sides. Installed to through-holes in the outer sides of the support fixtures are movable side connecting rods and situated at their lower ends are the mounting holes of axles stays that provides for the installation of front wheels. Situated at the upper ends of the left and right side connecting rods is a top connecting rod that provides for the synchronous deflection of the side connecting rods. The rear wheel assembly is disposed at the posterior aspect of the footboard and has installed at its center two rear mounting blocks. The rear mounting blocks have a support fixture installed to each of their two sides and movable side connecting rods are situated on the outer ends of the support fixture, with the mounting holes of axle stays at their lower ends providing for the installation of rear wheels; also linked to the upper ends of these side connecting rods is a top connecting rod and, furthermore, springs are installed between the center of the rods and the support fixtures to enable the positional return of the side connecting rods. As such, the structure of the present invention provides substantially more performance and, furthermore, increases the practical value of products in the category of the present invention.

1 Claim, 5 Drawing Sheets

STRUCTURE OF SCOOTER

BACKGROUND OF THE INVENTION

1. Field of the Invention

The invention herein relates to an improved structure scooter comprised of a footboard, a front wheel assembly, and a rear wheel assembly, wherein the front wheel assembly is disposed at the anterior aspect of the footboard and is equipped in the center with an extension plate of a front mounting block that, furthermore, has a support fixture mounted to each of its two sides that are each actively linked to a side connecting rod, and front wheels are installed at the lower ends of the side connecting rods, with a top connecting rod coupling their upper ends; the rear wheel assembly is disposed at the posterior aspect of the footboard and has installed at its center two rear mounting blocks with a support fixture of an actively linked side connecting rod installed to each of their two sides, and rear wheels are installed to the lower ends of the side connecting rods, the upper ends of which are coupled by a top connecting rod, and positional return springs are installed between the center of each connecting rod and support fixture.

2. Description of the Prior Art

Referring to FIG. 1 and FIG. 2, the conventional product is comprised of a spherical handle 41, a topside stem 4, a mounting device 46, a splayed forward frame 40, front wheels 42, a footboard 44, a rear wheel 43, and springs 45, of which the splayed forward frame 40 is disposed at the anterior aspect of the footboard 44 and mounted to each of its two sides is a wheel block 400 that provides for the installation of the front wheels 42, and situated in the center area of the splayed frame 40 are compression springs 45 each positioned against the interior sides of a wheel block 400; the topside stem 4 is disposed at the upper extent of the splayed forward frame 40 and a spherical handle 41 positioned at the upper end of the topside stem 4, and a mounting device 46 is situated between the splayed forward frame 40 and the topside stem 4; and a single rear wheel 43 is installed in the center posterior aspect of the footboard 44; since the structural design of the conventional product is not sound, its operation involves the manual grasping of the spherical handle 41 of the topside stem 4 to control the scooter to the left or right such that when the topside stem 4 is leaned to one side, this results in the application of pressure against the wheel at one side of the front wheels 42 which causes the springs 45 on one side to compress and alter direction, but since the wheel on the other side of the front wheels 42 continues in a straight line, both of the two front wheels 42 are incapable of effectively deflecting synchronously, resulting in rough and unresponsive operating control which not only subjects the front wheels 42 to damaging wear and thus significantly diminishes their usable service life, but also increases the likelihood of hazardous accidental collisions with vehicles, walls, power line poles, people, and animals because immediate changes in direction cannot be executed; in addition, since swerving is manually accomplished by a single hand on the topside stem 4 to control the application of pressure onto the springs 45, with virtually no assistive control provided for by the footboard 44, the grip of a single hand for control and the exerted force thereof in combination with a three-wheel structure is inconvenient, unstable, time- and energy-wasting and, furthermore, easily results in an improperly biased application of force angle and consequent toppling; such shortcomings have always irritated and troubled consumers and, therefore, the necessity of the providing an improve structured scooter is the motive of the invention herein.

SUMMARY OF THE INVENTION

The primary objective of the invention herein is to provides an improved structure scooter capable of responsive and stable, time- and energy-saving, as well as safe and convenient operation and utilization.

To enable a further understanding of the technological content, innovative aspects, and functionality of the present invention, the brief description of the drawings below is followed by the detailed description of the preferred embodiments.

DETAILED DESCRIPTION OF THE PREFERRED EMBODIMENTS

Figure 1:
FIG. 1 is an isometric drawing of a conventional product during utilization.
Figure 2:
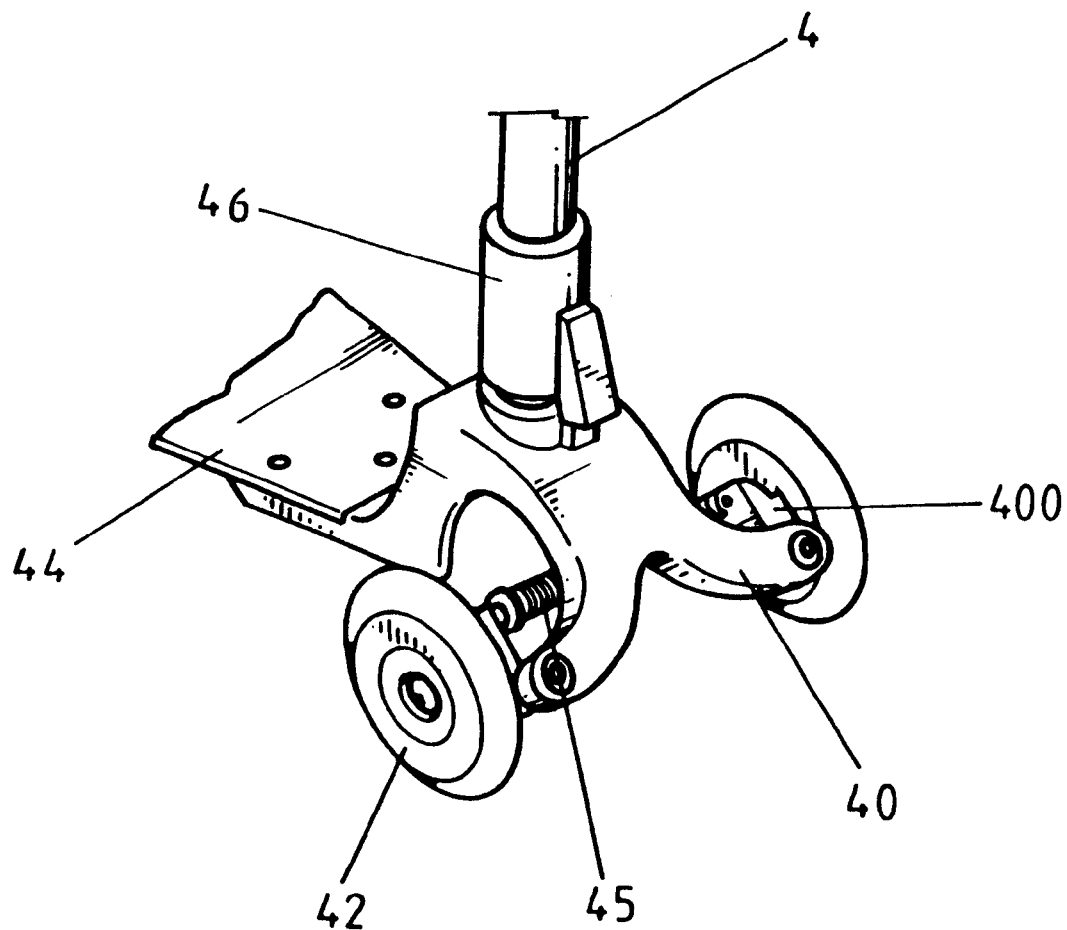
FIG. 2 is an isometric drawing of the front wheel section of a conventional product, as shown in a magnified view.
Figure 3:
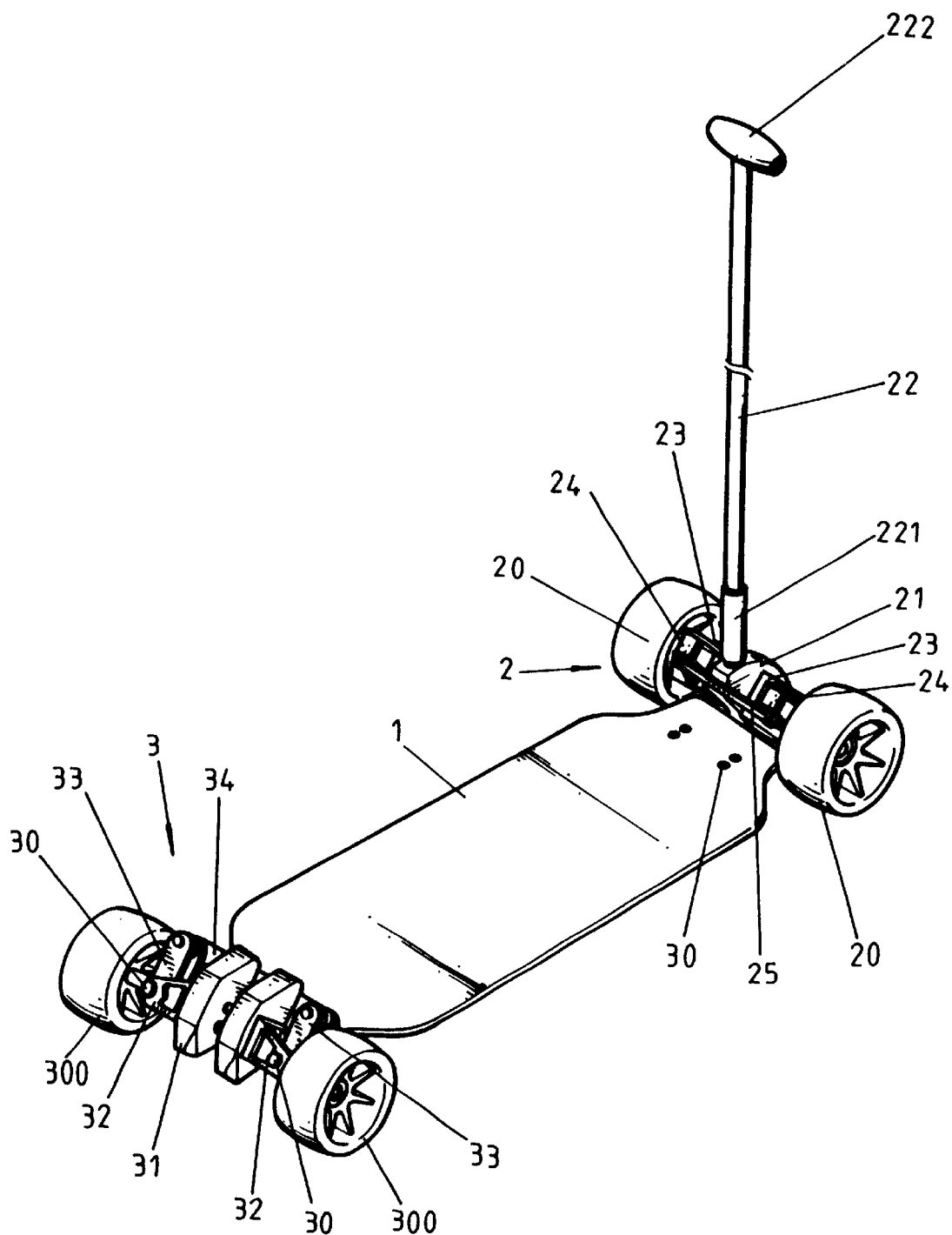
FIG. 3 is an isometric drawing of the invention herein.
Figure 4:
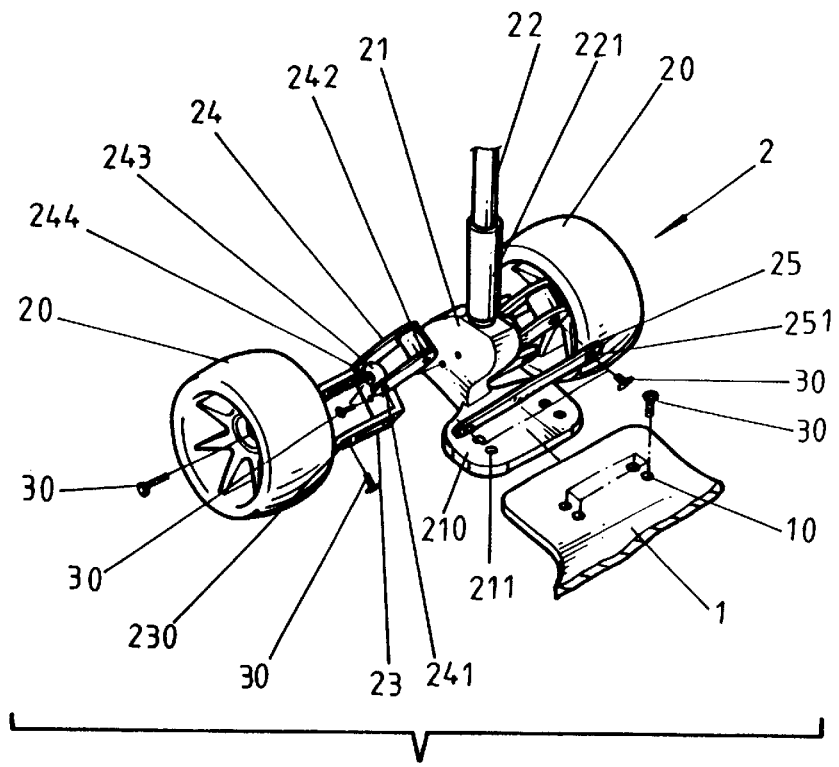
FIG. 4 is an exploded drawing of the front wheel assembly of the invention herein.
Figure 5:
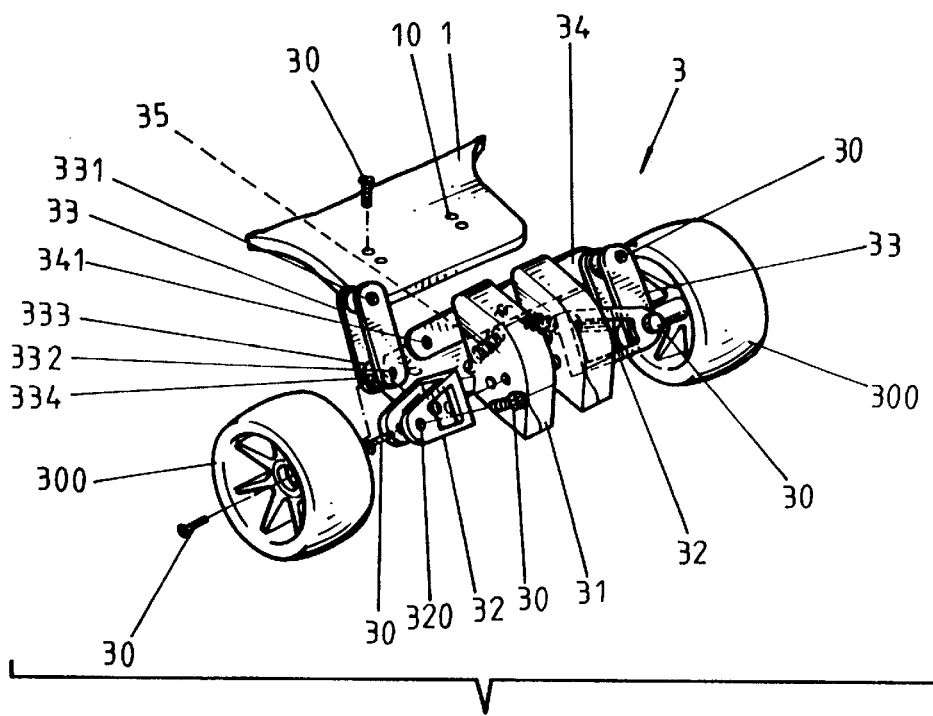
FIG. 5 is an exploded drawing of the rear wheel assembly of the invention herein.

Referring to FIG. 3, FIG. 4, and FIG. 5, the invention herein is comprised of a footboard 1, a front wheel assembly 2, and a rear wheel assembly 3, of which the front wheel assembly 2 is disposed at the anterior aspect of the footboard 1 and the rear wheel assembly 3 is disposed at the posterior aspect of the footboard 1 and, furthermore, a front mounting block 21 is positioned in the center of the front wheel assembly 2 (as shown in FIG. 4) and projecting from the rear extent of the front mounting block 21 is an extension plate 211 having through-holes 211; the extension plate 210 is assembled to the footboard 1 by means of fastening components 30 placed in the through-holes 211 of the extension plate 21o and the front-end through-holes 10 of the footboard 1. To provide for the leftward and rightward swaying operation of the front mounting block 21, a topside stem 22 is disposed in the upper extent of an active sleeve 221 of the front mounting block 21 and, furthermore, positioned on the upper extent of the topside stem 22 is an ellipsoidal handhold 222 that can be gripped by one or two hands during operation, and the topside stem 22 can be pulled up from the active sleeve 221 at its lower extent and folded against the footboard 1 to reduce physical size and thereby facilitate storage and shipping. Furthermore, a support fixture 23 is installed to each of the two ends of the front mounting block 21 at an angle from the horizontal by means of fastening components 30, with through-holes 230 formed in the outer ends of the support fixtures 23 so that fastening components 30 can be inserted into the through-holes 241 and 242 of side connecting rods 24 for linkage into a movable structural entity and, furthermore, the through-holes 241 and 242 formed in the upper and lower ends of the side connecting rods 24 and the through-holes 230 of the support fixtures 23 are aligned with a mounting hole 244 of an axle stay 243 such that the mounting hole 244 provides for the installation of the front wheels 20 to complete the assembly of a single structural entity by means of fastening components 30 and, furthermore, in which the front wheels 20 of the side connecting rods 24 are enabled to sway synchronously; and a top connecting rod 25 is linked to the said assembly via the through-holes 242 at the two sides.

The rear wheel assembly 3, as indicated in FIG. 5, is installed to the footboard 1 by inserting fastening components 30 into the through-holes 10 of the footboard 1 and has installed at its center two parallel rear mounting blocks 31, mounting components 30 are placed into the through-holes 320 of a support fixture 32 at the two sides of the rear mounting blocks 31 and, after placement into the through-holes 320 of the support fixtures 32, mounting components 30 are then coupled to the through-holes 331 and 332 of the side connecting rods 33; mounting holes 334 of axle stays 333 are formed to achieve alignment at the lower through-holes 332 area of the support fixtures 32, where they are linked to the side connecting rods 33; the rear wheels 300 are installed to the mounting holes 334 by means of fastening components 30 and at the upper through-holes 331 area, with a top connecting rod 34 having through-holes 341 for the placement of fastening components 30 allowing assembly into a movable structural entity; and to provide for the positional return of the rear wheels 300 and the side connecting rods 33, two return springs 35 are installed between the center of the connecting rods 34 and both the left and right support fixtures 32.

Figure 6:
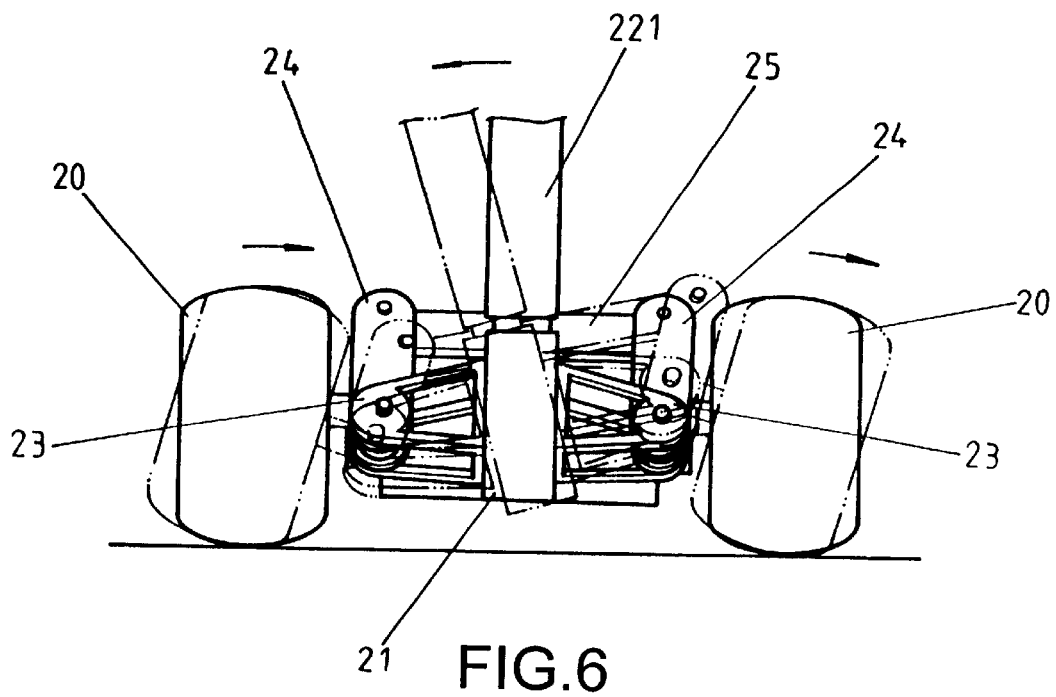
FIG. 6 is an orthographic drawing of the front wheel assembly of the invention herein, as viewed from a frontal perspective.

Referring to FIG. 6, when executing a right turn with the front wheels 20, it is only necessary to pull the T-shaped handhold 22 of the topside stem 22 towards the right, at which time the support fixtures 23 articulate the front mounting block 21 at the center into an inclined arrangement and, since a support fixture 23 is installed on each of its two sides, the side connecting rods 24 are actively linked via the through-holes 230 at the ends of the support fixture 23, and the top connecting rod 25 is installed between the said side connecting rods 24, therefore, when the support fixtures 23 move, the originally vertical front wheels 20 become canted in the opposite direction from the topside stem 22 and, furthermore, since the front wheels 20 situated at the lower extent of the side connecting rods 24 and the top connecting rod 25 is coupled at their upper end deflect synchronously, the two front wheels 20 cause the scooter to turn towards the right; when the topside stem 22 is vertical, the support fixtures 23 immediately respond to the movement of the front mounting block 21 and return into position, at which time the front wheels 20, the side connecting rods 24, and the top connecting rod 25 assume the perpendicular arrangement defining the return position, causing the scooter to proceed straight ahead; by the same reasoning, when the topside stem 22 is utilized to execute a left turn, the front wheels 20 perform the said mechanical sequence in reverse order, enabling the scooter to turn towards the left; as such, operation and utilization are quite responsive, time- and energy-saving, as well as stable and safe.

Figure 7:
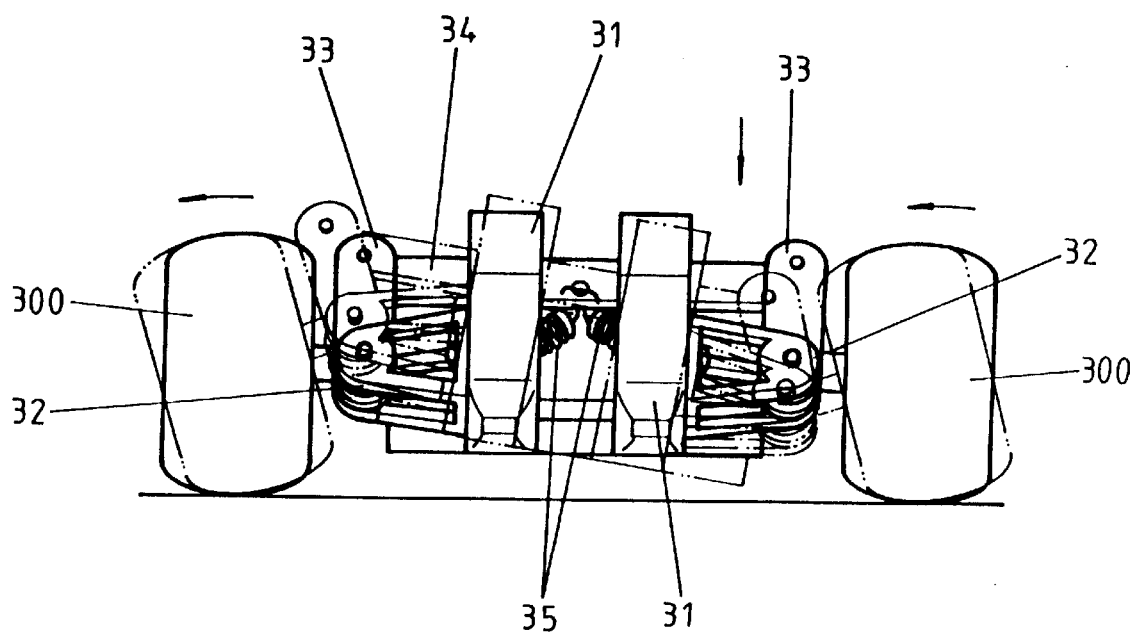
FIG. 7 is an orthographic drawing of the rear wheel assembly of the invention herein, as viewed from a rear perspective.

Referring to FIG. 7, as the scooter executes a right turn, it is only necessary to focus the body weight of the rider onto the right side of the footboard 1, at which time the rear mounting blocks 31 become inclined and, furthermore, causes the movement of the support fixtures 32 installed to them and since the through-holes 320 in the outer ends of the support fixtures 32 are actively linked to the side connecting rods 33 and the rear wheels 300 as well as the active top connecting rod 34 are respectively installed to the axle stays 33 at the lower extent of the side connecting rods 33 and the through-holes 331 area at their upper extent, force exerted against the connecting rods 33 and the rear wheels 300 causes an inclination towards the other side and, furthermore, when the force of lean is no longer applied to the scooter 1, since springs 35 are installed between the center of the connecting rods 34 and the support fixtures 32, the topside stem 34 is immediately drawn retentively to the center, causing the rear wheels 300 to resume a perpendicular orientation such that the scooter proceeds on a straight course; when force is applied to the other side, the front wheels 300 perform the reverse of the said mechanical sequence and similarly, operation and utilization are quite responsive and stable, time- and energy-saving, as well as safe and convenient. Furthermore, since the four wheels of the invention herein rotate simultaneously, it can be operated mainly by foot-power and assistively by the hands and arms, with stable operation afforded whether one or two hands are employed such that turns of large or small radii can be executed as required by the user to both change direction and resume an original course.

In summation of the foregoing section, since the invention complete overcomes the drawbacks of the conventional product, is functionally progressive, increases the practical value of products in the same category and, furthermore, was not observed publicly or in public utilization prior to patent application and is not a structure easily accomplished by person skilled in the relevant technology, the present invention fully complies with new patent requirements and is hereby submitted to the patent bureau for review and the granting of the commensurate patent rights.

What is claimed is:

1. An improved structure scooter that is responsive and stable, time- and energy-saving, as well as safe and convenient, that is comprised of a footboard, a front wheel assembly, and a rear wheel assembly, of which the front wheel assembly is disposed at the anterior aspect of the footboard and the rear wheel assembly is disposed at the posterior aspect of the footboard; the directional control of the front wheel assembly is articulated by a topside stem having an active sleeve at its lower extent that provides for folding of the topside stem against the footboard, the innovative features are:

an ellipsoidal handhold is positioned on the upper extent of the topside stem and a front mounting block is situated at the lower extent of the topside stem and attached thereto, an extension plate projecting from the rear extent of the front mounting block provides for assembly to the footboard by through holes and fasteners, said front mounting block has a support fixture fixedly attached to each of its two sides at an angle from the horizontal, the lower extent of two side connecting rods is actively linked to the support fixtures by through holes formed in both the support fixtures and the connecting rods, the mounting hole of an axle stay is provided on the lower extent of each of said side connecting rods to provide for the installation of front wheels, a synchronously swaying top connecting rod is actively linked to through holes in the upper extent of the side connecting rods, the rear wheel assembly has two rear mounting blocks positioned in the center of the assembly, a support fixture is installed on each of the outer sides of the mounting block at an angle from the horizontal, through holes in the outer ends of said support fixtures are linked to corresponding through holes in the lower extent of side connecting rods, a mounting hole of an axle stay is provided on the lower extent of each side connecting rod for the installation of rear wheels, a top connecting rod that causes the synchronous canting of the rear wheel is linked to the upper extent of said side connecting rods by through holes in both the top connecting rod and the side connecting rods, return springs are installed between the center of the top connecting rod and both the left and right support fixtures such that when the topside stem is displaced or foot force is applied to one side of said footboard, the front and rear mounting blocks are deflected causing the synchronous deflection of the support fixtures, which in turn actuates the connecting rods installed at the front and rear wheel assemblies to both cant, and turn the wheels, thereby enabling the scooter of the present invention to execute turns.

* * * * *